United States Patent [19]

Mrozinski

[11] Patent Number: 5,399,373
[45] Date of Patent: Mar. 21, 1995

[54] PROCESSES FOR REPAIRING ARTICLES HAVING WOOD APPEARANCE FORMED FROM SYNTHETIC RESINS

[76] Inventor: John B. Mrozinski, 4919 Dock St., Onekama, Mich. 49675

[21] Appl. No.: 115,861

[22] Filed: Sep. 2, 1993

[51] Int. Cl.⁶ .............................................. B32B 35/00
[52] U.S. Cl. ...................................... 427/140; 427/202; 427/264; 427/267; 427/271; 427/355; 427/407.1; 427/412.1
[58] Field of Search ............... 427/140, 262, 264, 267, 427/274, 355, 407.1, 412.1

[56] References Cited

U.S. PATENT DOCUMENTS

| | | | |
|---|---|---|---|
| 3,810,801 | 5/1974 | Speer | 427/140 |
| 4,013,495 | 3/1977 | Golumbic | 427/140 |
| 4,133,913 | 1/1979 | Moore | 427/140 |
| 4,260,439 | 4/1981 | Speer | 427/140 |
| 4,510,001 | 4/1985 | Speer | 427/140 |
| 4,948,443 | 8/1990 | Speer | 427/140 |
| 5,075,059 | 12/1991 | Green | 264/129 |

*Primary Examiner*—Janyce Bell
*Attorney, Agent, or Firm*—Price, Heneveld, Cooper, DeWitt & Litton

[57] ABSTRACT

Various processes are disclosed for repairing damage to one or more articles having wood-like appearance and formed from synthetic resins.

12 Claims, 1 Drawing Sheet

PROCESSES FOR REPAIRING ARTICLES HAVING WOOD APPEARANCE FORMED FROM SYNTHETIC RESINS

BACKGROUND OF THE INVENTION

The present invention relates to processes for repairing articles having a wood-like appearance which are formed from synthetic resins as described in United States patent application entitled PROCESS FOR PRODUCING ARTICLES FROM SYNTHETIC RESINS HAVING WOOD APPEARANCE, filed on or about Dec. 7, 1990. Such articles are typically produced by first forming a model or plug of the product from real wood having the desired grain pattern. The wooden model is then treated to open the wood grain. A mold is formed from the treated wooden model by application of a liquid mold resin to the exterior of the wooden model. An impression of the wood grain of the wooden model is cast in the surface of the mold resin, at the interface of the mold and the surface of the wooden model. Articles having wood-like appearance may then be formed from the mold by application of a synthetic resin impregnated with a base coat coloring to the mold surface, the mold surface containing the wood grain pattern, and depositing thereon a supportive substrate. After sufficient curing, the resulting synthetic resin article is removed frown the mold and a viscous pigmented toner paste is applied to the wood grain pattern. Remarkable wood-like appearance results after wiping the paste on the surface and in the simulated wood grain pores of the article to the desired color intensity. In most instances a transparent protective layer is applied over the surfaces having the wood grain pattern formed therein.

It is envisaged that such synthetic resin articles may be utilized in a variety of fashions, such as in furniture, household trim, boats and RV vehicles and related equipment, automotive components, audio speaker cabinets, ceiling fans, and a multitude of consumer goods. When such articles are utilized in or upon objects which are subject to heavy use, it is inevitable that damage, at least to some extent will occur to the synthetic resin article.

Since the primary reason for utilizing such articles is their remarkable wood-like appearance, it follows that when such articles are damaged, in order for a repair process to be acceptable, it must mend the damaged area and more importantly, restore the remarkable wood-like appearance of the article. The unique structure and manner by which the above described articles are formed and thus achieve their remarkable wood-like appearance, precludes use of any of the known repair processes for articles produced from synthetic resins. Those processes merely comprise depositing an amount of a filler material in the damaged region and after sufficient drying or hardening, sanding the repaired region and surrounding undamaged regions, followed by an appropriate coating or painting operation.

An unattractive appearance results if articles having a wood-like appearance and formed in accordance with the above noted process are repaired by any of these known repair processes. Moreover, if the damage extends into the wood grain pattern or the underlying substrate, restoration of the original wood grain pattern of the article is virtually impossible.

As far as is known by the present inventor, there currently exists no process for repairing nicked or scratched or otherwise damaged synthetic resin articles having wood-like appearance. Thus, there is a need for a process for repairing such articles which mends the damaged areas and restores the remarkable wood-like appearance of the articles.

Moreover, in those instances in which multiple articles are utilized to provide a large, expansive, continuous wood grain pattern, and damage to one or more articles occurs which is so severe that the article(s) must be replaced, the remarkable wood grain appearance of the articles makes replacement very difficult, since matching the wood grain pattern of a replacement article with that of undamaged regions of neighboring or adjacent existing articles is virtually impossible. Thus, there is a need for a process of repairing severe damage to one or more of a group of synthetic resin articles, such that the wood grain pattern of the repaired region matches that of undamaged regions. By applying the processes of the present invention to a replacement article as described herein, the appearance of the article may be restored to that of the original.

SUMMARY OF THE INVENTION

The present invention provides repair processes for varying degrees of damage to one or more articles having wood-like appearance and formed from synthetic resins. A first repair process provides for repair of damage to either the outer surface or protective layer of the damaged article. A second repair process provides for repair of damage to the toner layer of the damaged article. A third repair process provides for repair of damage to the wood grain layer or to the substrate of the damaged article, so long as the damaged region does not extend entirely through the thickness of the article. These three repair processes may be utilized for repair of a single article or for repair of a group of articles which form a continuous wood grain pattern. A fourth repair process provides for repair of damage extending entirely through the thickness of at least one article of a group of articles which form a continuous wood grain pattern.

DESCRIPTION OF PREFERRED EMBODIMENTS

The present invention relates to processes for repairing articles having wood-like appearance which are formed from synthetic resins. The invention provides particular processes for repairing such articles so that an optimal appearance, that is a realistic wood grain appearance, is achieved. Depending upon the degree and extent of damage of the article, one of several particular repair processes is selected as described below. As used herein, the term "damage" encompasses physical damage, defects, or imperfections existing in the article's surface and/or structure. Such damage may result from nicking, gouging, scratching or scraping the exterior surface of the article, from more severe damage such as fracturing or cracking of the article, and includes even more extreme forms of abuse such as completely shattering a region of the article or creating a fissure, opening, or perforation entirely through the article.

Figure 1:
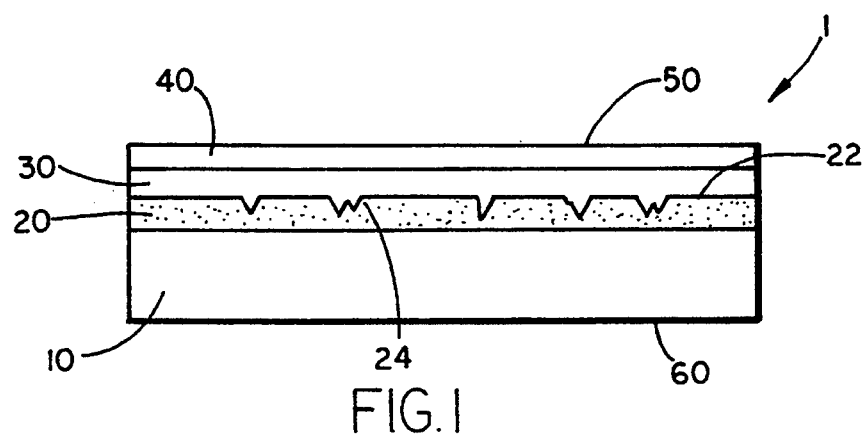
FIG. 1 is a cross section of an article made from a synthetic resin, having a wood-like appearance.

FIG. 1 illustrates a cross section of article 1 having an underlying surface 60 and an outer surface 50 through which a wood grain pattern 24 may be viewed. Article 1 comprises a substrate 10, a wood grain layer 20, a toner layer 30, and a protective layer 40. Substrate 10 is preferably a fiberglass reinforced polyester resin or vinyl ester resin, although other resins and reinforcement materials may be used. Wood grain layer 20 is preferably formed from a gel coat material which is compatible with the resin forming substrate 10. As a result of the manufacturing process of article 1, the mold pattern, and thus the wood grain pattern 24, is formed and retained in wood grain layer 20. Preferably, wood grain layer 20 has a base coat coloring 22 dispersed throughout it. Typically, a beige or light tan color is used, and this color is typically somewhat lighter than the simulated wood color of outer surface 50 of article 1. Most gel coat materials are available already containing a coloring pigment. Deposited upon and extending into wood grain layer 20 is a toner layer 30. Toner layer 30 generally comprises a pigmented viscous paste. A portion of the pigmented viscous paste of toner layer 30 resides in the minute crevices and depressions of wood grain pattern 24. Covering toner layer 30, wood grain layer 20 and substrate 10 is protective layer 40. Protective layer 40 is preferably a transparent, durable, weather-resistant material such as a clear lacquer or urethane. After forming and drying protective layer 40, it will generally have a high gloss finish. In applications where this is not desired, the gloss finish is dulled by a light application of steel wool after the layer is cured.

Depending upon the degree of damage to the article, the article is repaired by selecting and performing one of the processes of the present invention. For purposes of discussion herein, the repair processes of the invention are designated as I, II, III, or IV. Process I repairs damage occurring to either outer surface 50 or protective layer 40. Process II repairs damage to toner layer 30. Process III repairs damage to wood grain layer 20 or damage not quite extending through the entire thickness of substrate 10. Process IV repairs damage extending through the entire thickness of substrate 10 (e.g. a hole) of one or more of a group of articles forming a continuous wood grain pattern.

Process I

Process I repairs damage to one or both of outer surface 50 and protective layer 40. The damaged area is cleaned, preferably with a clean cotton cloth soaked with acetone, to remove any dirt or grease residing on the surface of the article. The damaged area is removed from the affected layers or areas of the article. This may be performed by lightly sanding the damaged regions with a very fine sandpaper such as #400. Sanding of the damaged area is performed until the damaged regions are removed and regions of removal or depressions are formed. During the sanding operation, adjacent nondamaged regions of protective layer 40 surrounding the damaged region are also lightly sanded such that a smooth transition is obtained between the nondamaged regions and the sanded damaged regions of protective layer 40. The sanded areas, e.g. regions of removal, of protective layer 40 and adjacent areas of nonsanded protective layer 40 surrounding the sanded area, are then prepared by applying a cleaning solution compatible with the underlying protective layer 40, and those areas lightly wiped clean. Where protective layer 40 is a urethane, it is preferable to clean the sanded areas of layer 40 with AWLPREP PLUS-T0008, available from U.S. Paint of St. Louis, Mo. 63103.

Next, a sufficient amount of a transparent, durable material is applied to the sanded area of protective layer 40. Although the most preferred manner of application of protective layer 40 is by spraying, other methods may be employed such as brushing, sponging, or rolling. This transparent material forms protective layer 40 in the regions of article 1 under repair. The most preferred material for protective layer 40 is a urethane. Other suitable materials include clear acrylic and varnish. An example of a suitable varnish is ALGRIP available from U.S. Paint. Where urethane is selected as the transparent material, it is most preferable to apply a urethane composition such as AWLBRITE No. 3050 or 3051, available from U.S. Paint. The AWLBRITE composition is a two-part mixture comprising a hardener and a resin solution. After thoroughly mixing the two parts, the AWLBRITE composition is applied to the appropriate areas under repair and allowed to cure. It may be necessary to apply several coats of the transparent material (e.g. AWLBRITE) to build up the thickness of the damaged region under repair to that of the surrounding nondamaged regions. Another suitable urethane is FOXFIRE F-3016 available from Midwest Coatings of Grand Rapids, Mich. Depending upon the desired finish and appearance of the protective layer, it is envisaged that the protective layer may have a satin or gloss finish.

After the material for protective layer 40 has sufficiently dried or cured as the case may be, outer surface 50 of the repaired area may be buffed with a very fine glazing compound such as 3M Liquid Polish or FINESSE-IT. When polishing outer surface 50 of the repaired area of protective layer 40, it is preferable to also lightly buff the outer surfaces of the adjacent nondamaged regions of protective layer 40 so that a smooth transition between adjacent surfaces is obtained.

Process II

Process II repairs damage to toner layer 30. The damaged area is first cleaned, preferably by wiping the damaged area with a clean cotton cloth containing acetone. A light pressure may be applied to the damaged region during the wiping process to ensure that any minute particles, debris or surface dirt are removed from the damaged region. The damaged area is then sanded with a very fine sandpaper. Sanding is performed until the damage marks are removed from the surface of article 1. Thus, sanding occurs through the thickness of protective layer 40 and within or through toner layer 30. It is important that repeated inspections be made of the area being sanded to ensure that sanding is not conducted into wood grain layer 20, which would destroy wood grain pattern 24. After sufficiently sanding the damaged region so that evidence of any damage marks has been removed, the damaged area is again wiped with a cleaning cloth containing acetone.

Material for toner layer 30, namely a pigmented viscous paste, is then applied to the region of article 1 under repair. A preferred material for toner layer 30 is an artist oil or mixtures of several artist oils, available from Grumbacher. In addition, Duro artist oils are also suitable. The present inventor envisages that a variety of acrylic based colorants could be used such as Grumbacher Acrylics, or combinations of oil based and acrylic based materials. If a preferred artist oil is being utilized for toner layer 30 it is even more preferable to add a drying solution to the oil to expedite drying. Typical drying solutions include Japan Dryers, also available from Grumbacher. A typical ratio of drying solution to artist oil is one drop of drying solution to one tablespoon of artist oil. After thoroughly mixing, the pigmented viscous paste (with or without the drying solution) is applied to the region under repair as follows. An "effective amount" of the material for toner layer 30 is applied to the sanded surface of the region under repair with a clean dry cloth. An effective amount is that amount which results in the desired appearance of wood grain 24. Preferably, the underlying wood grain layer 20 is entirely covered by the material for toner layer 30. Using this same cloth, the damaged area is wiped in the same direction as the grain pattern 24 extends. It is preferable to wipe such regions slightly beyond the border of the sanded and nonsanded areas into nonsanded regions. Although the preferred manner of application of material for toner layer 30 is by wiping with a cloth, it is envisaged that a buffing pad or wheel could be employed. Excess material for toner layer 30 is removed by wiping the regions under repair, again in the same direction that wood grain pattern 24 runs, with a sweeping uplift stroke. The repaired region is then allowed to dry for approximately 4 to 6 hours.

After repaired toner layer 30 has thoroughly dried, a first coat of a transparent, durable material such as a urethane (e.g. AWLBRITE No. 3050 or 3051) is applied onto toner layer 30 to a thickness of about 6 mils. After the first coat of the transparent material has sufficiently dried, the material in the region under repair is lightly sanded with a very fine sandpaper. The area is then cleaned, preferably by wiping with an acetone soaked cloth. A second coat of the transparent material is then applied and allowed to dry. In those instances where urethane is employed as transparent material for protective layer 40, it is important that no more than two coats of urethane are applied per day. Additional coats of transparent material are applied until protective layer 40 of the region under repair has been built up to a height comparable to the surrounding nondamaged areas of article 1. At this stage, it is preferred that the entire outer surface 50 of article 1 is abrasively treated by sanding with a very fine sandpaper and cleaned, preferably by wiping with an acetone soaked cloth. A final coat of transparent material, preferably urethane, is then applied to the sanded surface of article 1. After protective layer 40 has dried, outer surface 50 may be buffed with a very fine glazing compound such as 3M Liquid Polish or FINESSE-IT.

Process III repairs damage to wood grain layer 20 or damage not extending through the entire thickness of substrate 10. Repair Processes III and IV require the appropriate mold utilized in forming the article. This is necessary in view of the intricate and continuous nature of the wood grain pattern and the near impossibility of matching wood grain formed in repaired, once-damaged regions with adjacent, nondamaged regions. It is envisaged that the manufacturer of the synthetic resin articles having wood-like appearance as described herein, would either provide access to, or maintain an inventory of molds or stamps for forming wood grain pattern 24 for the articles it produced. The manufacturer might opt to provide a quantity of these stamps to its distributors or retailers for even easier access to such stamps by purchasers of its articles. Thus, it is envisaged that the individual or company repairing damage to the wood grain pattern or the substrate, would have access to such stamps and could merely contact the manufacturer or distributor for leasing use of a stamp, or for purchasing the stamp itself.

Figure 2:
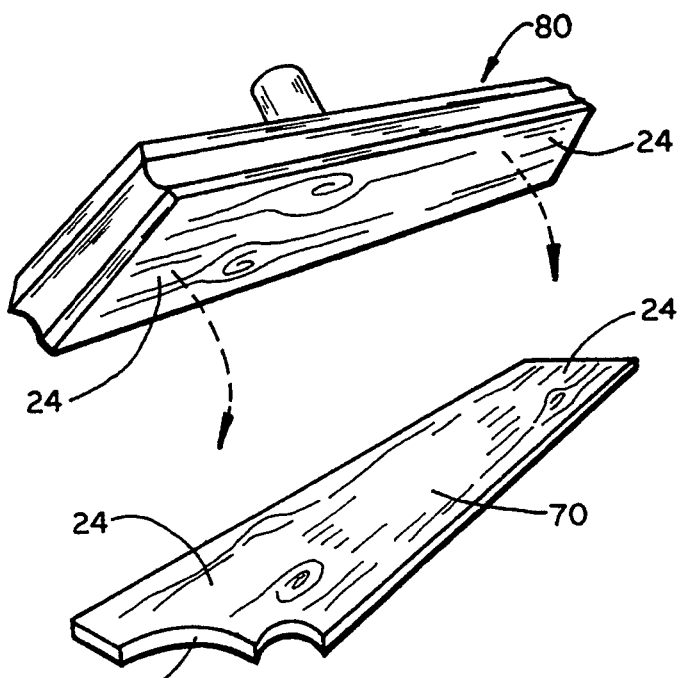
FIG. 2 is an illustration of one aspect of one of the repair processes of the present invention.

In Process III, generally illustrated in FIG. 2, the damage marks are first sanded with a fine or medium sandpaper such as #120, through protective layer 40, toner layer 30, and wood grain layer 20 until underlying substrate 10 is reached and a region of removal 70 is formed. It is preferable to sand the adjacent areas surrounding the regions of damage so that a relatively smooth transition is obtained between the local damaged region and the surrounding nondamaged regions. After forming the region of removal, that area is cleaned with a cloth containing a cleaning solution, preferably acetone.

If damage has occurred through wood grain layer 20 and into, but not extending entirely through substrate 10, a resin material is applied to the damaged region of substrate 10 to a thickness approximately equal to the original thickness of substrate 10. It may be necessary to build the thickness up by application of several coats of resin. A preferred resin is VE 8115 B-369102 Vinyl ester resin, available from Interplastic Corporation, Commercial Resins Division.

Next, a coating of a viscous gel coat material, preferably U.N. 1866, Resin Solution—Lite Tan, 951-N-403, 351992102347-2-307 by Cook Composite, is applied to the sanded region under repair to a thickness of approximately 8 mils as a base for forming wood grain layer 20. Such resin is available from Cook Composite and Polymers, Armor Cote Inc. If the gel coat material is not colored, it is desirable to add an amount of base coat coloring 22 to the gel coat material prior to application to provide a base tan or beige color to wood grain layer 24. It is also preferred that a curing catalyst be added to the gel coat material prior to application. An example of a curing catalyst is HIGH POINT 90 available from U.S. Peroxygen. The catalyst may be added in an amount of about 1%. The preferred manner for applying the gel coat material is by spraying. Other methods of application include brushing, pouring or rolling the material onto the surface.

After application of the gel coat, a polyvinyl acetate air sealer layer is deposited upon the gel coat material preferably by spraying, although other methods of application are possible such as wiping or brushing. The air sealer layer is necessary so that the gel coat material cures. The present inventor has surprisingly discovered that liquid additive wax sealers may not be used in conjunction with the gel coat material as might be expected since addition of such liquid additives causes the toner materials to lose their retention within wood grain pattern 24. Before the viscous gel coat material dries, wood grain pattern 24 is impressed into the gel coat material by a stamp 80 which has been adequately waxed and having the appropriate wood grain pattern 24 on its stamping surface. After pressing the stamp into the gel coat material, the stamp is either clamped into position or weighted and maintained in its position by gravity. After the gel coat material has sufficiently hardened, typically between 30 minutes and several hours, the stamp is removed. The region under repair is then wiped with a clean cloth and water to remove any residual polyvinyl acetate on the surface of the repair region, and to better expose the underlying wood grain pattern 24. Next, the region is wiped with a cloth containing acetone to remove any residual dirt or particles. The remaining steps of repair parallel the repair process for Process II beginning with the application of material for toner layer 30.

Process IV

Figure 3:
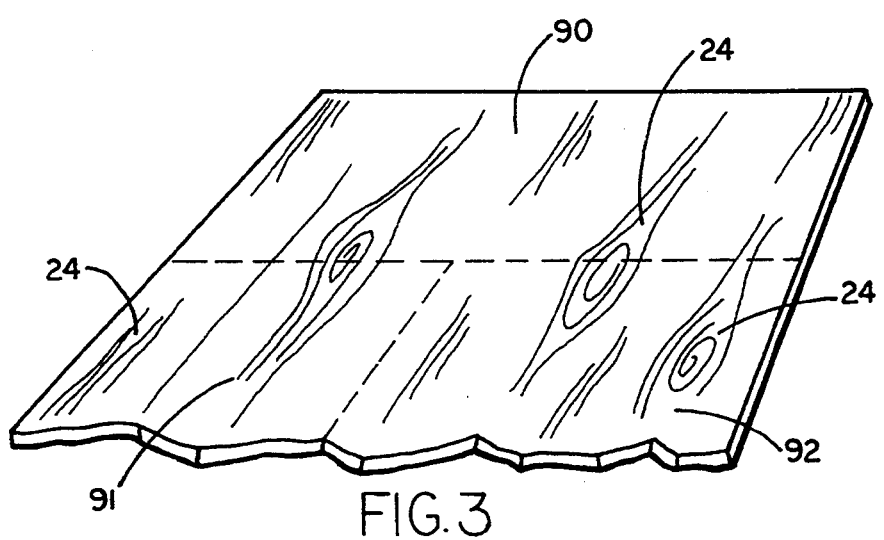
FIG. 3 is an illustration of a continuous wood grain pattern formed over a group of articles.

Process IV is directed toward repair of one or more of a group of articles which form a continuous wood grain pattern which have been severely damaged, having holes or perforations extending entirely through one or more of the articles. For large surface areas in which a group of articles 90, 91 and 92 such as illustrated in FIG. 3, are arranged to form an apparently continuous wood grain pattern 24 over the entire area, when a portion of that area is damaged, it is important that repair of the damaged area does not disrupt the apparently continuous wood grain pattern of the group of articles. In instances where the extent of damage is damage other than holes or perforations through one or more of the articles, any of Processes I–III may be used upon the one or more damaged articles of the group. However, a particular process, namely Process IV is to be employed when one or more articles of the group which form a continuous wood grain pattern, are perforated or severely punctured.

The initial step for Process IV is to identify which of the damaged articles of the group are in need of replacement. Such identification may be accomplished by referring to a schematic or other illustration designating the arrangement of articles, and then identifying the damaged articles on the schematic by their location. It is envisaged that each article would have its own part number or identifier which could be referred to when ordering unfinished, replacement articles.

Once the damaged articles have been identified, and unfinished, replacement articles obtained, perhaps from the manufacturer or distributor, the articles of the group which contain the damaged areas are removed from the group so that the damaged area is completely removed from the group of articles. The unfinished, replacement articles are then installed into the group in their respective positions so that the continuity of the wood grain pattern is restored or re-established. The remaining steps of repair parallel the repair process for Process II beginning with the application of material for toner layer 30.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the doctrine of equivalents.

The embodiments of the invention in which an exclusive property or privilege is claimed are defined as follows:

1. A process for repairing damage to an article having a wood appearance, said article formed from at least one synthetic resin and having a substrate, a toner layer, a wood grain layer disposed between said substrate and said toner layer, and an outermost protective layer sufficiently transparent to allow viewing of said wood grain layer, said article further having a region of damage in at least one of said wood grain layer and said substrate, said process for repairing damage comprising:
    removing said region of damage from at least one of said wood grain layer and said substrate to form a region of removal;
    applying a coating of a gel coat material containing a base coat coloring dispersed throughout said gel coat material to said region of removal, wherein said gel coat material is a pigmented or colored, uncured, polymer-based material that when cured, forms a hardened gel coat layer of substrate;
    applying an air sealer material to said gel coat material in said region of removal, wherein said air sealer material is a polymeric material that forms a temporary, protective seal that prevents contact between said gel coat material and air;
    obtaining a stamp having an appropriate wood grain pattern on its stamping surface;
    impressing said wood grain pattern of said stamp into said gel coat material and air sealer material;
    maintaining said stamp impressed into said gel coat material until said gel coat material sufficiently hardens to thereby form a stamped wood grain pattern;
    removing said air sealer material from said gel coat material;
    applying an effective amount of a pigmented viscous paste to said stamped wood grain pattern, wherein said viscous paste is a polymeric, colored or pigmented material having a paste-like consistency;
    drying said pigmented viscous paste;
    applying a sufficient amount of a transparent polymeric material to said stamped wood grain pattern and said pigmented viscous paste disposed thereon to form a first surface of transparent polymeric material.

2. A process for repairing damage to an article having a wood appearance in accordance with claim 1 further comprising applying a cleaning solution to said stamped wood grain pattern before applying said effective amount of said pigmented viscous paste.

3. A process for repairing damage to an article having a wood appearance in accordance with claim 1 further comprising:
    abrasively treating at least said first surface of said transparent polymeric material;
    applying a final coat of said transparent polymeric material to said abrasively treated first surface; and
    drying said transparent material to form an outer surface.

4. A process for repairing damage to an article having a wood appearance in accordance with claim 1, wherein step of applying said effective amount of said pigmented viscous paste is performed by depositing said paste onto a cloth and wiping said paste onto said hardened gel coat in the same direction that said wood grain layer extends.

5. A process for repairing damage to an article having a wood appearance in accordance with claim 4, wherein the entirety of said hardened gel coat is wiped with said cloth and said wiping is conducted beyond said hardened gel coat.

6. A process for repairing damage to an article having a wood appearance in accordance with claim 1 wherein said removing said region of damage is performed by sanding said protective layer, said toner layer, and at least one of said wood grain layer and said substrate.

7. A process for repairing damage to an article having a wood appearance in accordance with claim 1 wherein said gel coat material is applied to a thickness of about 8 mils.

8. A process for repairing damage to an article having a wood appearance in accordance with claim 1 wherein said base coat coloring material comprises a tan or beige colored pigment.

9. A process for repairing damage to an article having a wood appearance in accordance with claim 1 wherein said air sealer material comprises polyvinyl acetate.

10. A process for repairing damage to an article having a wood appearance in accordance with claim 9 wherein said application of said cleaning solution is performed by applying acetone to said region of removal.

11. A process for repairing damage to an article having a wood appearance in accordance with claim 1 wherein said application of said transparent polymeric material is a clear urethane composition 12. A process for repairing damage to an article having a wood appearance in accordance with claim 1 further comprising:

buffing said outer surface of said transparent polymeric material.

* * * * *

UNITED STATES PATENT AND TRADEMARK OFFICE
CERTIFICATE OF CORRECTION

PATENT NO. : 5,399,373
DATED : Mar. 21, 1995
INVENTOR(S) : John B. Mrozinski

It is certified that error appears in the above-indentified patent and that said Letters Patent is hereby corrected as shown below:

Column 1, line 28:

"frown" should be --from--.

Column 5, line 53:

Before paragraph, insert heading "Process III".

Column 9, line 7, claim 10:

"claim 9" should be --claim 1--.

Column 10, line 3, claim 11:

"After "wherein" delete --said application of--.

Signed and Sealed this

Tenth Day of October, 1995

Attest:

BRUCE LEHMAN

*Attesting Officer*   *Commissioner of Patents and Trademarks*